(12) United States Patent
Zhu

(10) Patent No.: US 11,182,465 B2
(45) Date of Patent: Nov. 23, 2021

(54) AUGMENTED REALITY AUTHENTICATION METHODS AND SYSTEMS

(71) Applicant: Ye Zhu, Westlake, OH (US)

(72) Inventor: Ye Zhu, Westlake, OH (US)

( * ) Notice: Subject to any disclaimer, the term of this patent is extended or adjusted under 35 U.S.C. 154(b) by 231 days.

(21) Appl. No.: 16/023,059

(22) Filed: Jun. 29, 2018

(65) Prior Publication Data

US 2020/0004948 A1  Jan. 2, 2020

(51) Int. Cl.
*G06F 21/36* (2013.01)
*G06F 3/01* (2006.01)
*G06T 19/00* (2011.01)

(52) U.S. Cl.
CPC .............. *G06F 21/36* (2013.01); *G06F 3/011* (2013.01); *G06T 19/006* (2013.01)

(58) Field of Classification Search
CPC ......... G06F 21/36; G06F 3/011; G06T 19/006
See application file for complete search history.

(56) References Cited

U.S. PATENT DOCUMENTS

| 8,416,263 | B2* | 4/2013 | Leung | G06T 7/35 345/633 |
| 8,968,099 | B1* | 3/2015 | Hanke | A63F 13/216 463/42 |
| 9,679,152 | B1* | 6/2017 | Young | G06F 21/6209 |
| 2002/0091974 | A1* | 7/2002 | Szydlowski | G06F 16/258 714/699 |
| 2003/0012410 | A1* | 1/2003 | Navab | G06K 9/209 382/103 |
| 2008/0150965 | A1* | 6/2008 | Bischoff | G06T 7/70 345/632 |
| 2011/0061100 | A1* | 3/2011 | Mattila | G06F 3/017 726/17 |
| 2011/0162066 | A1* | 6/2011 | Kim | G06F 21/36 726/18 |
| 2012/0113223 | A1* | 5/2012 | Hilliges | G06F 3/00 348/46 |

(Continued)

OTHER PUBLICATIONS

Nyang et al., Keylogging-Resistant Visual Authentication Protocols, Feb. 2014, IEEE Transactions on Mobile Computing, vol. 13, No. 11, pp. 2566-2579 (Year: 2014).*

*Primary Examiner* — Kenneth W Chang
(74) *Attorney, Agent, or Firm* — Renner, Kenner, Greive, Bobak, Taylor & Weber Co., L.P.A.

(57) ABSTRACT

An augmented reality (AR) authentication method and system provides an AR environment that is presented on a display. The AR environment combines real-world object images captured by a camera with computer generated virtual icons. The virtual icons may be "mapped" to the real-world objects, whereupon the real-world objects take on the characteristics of the mapped images. During an authentication process, a user interacts with the AR environment by a variety of techniques to enter their passcode. Such interaction may include physically moving objects in the real-world so that such movement is reflected in the AR environment; controlling the "mapped" real-world objects through user interaction with the AR environment via an input device; and controlling the virtual icons through user interaction with the AR environment via the input device. Accordingly, if the user interacts with the AR environment in a manner that matches their previously "set" passcode the user is authenticated.

18 Claims, 5 Drawing Sheets

(56) References Cited

U.S. PATENT DOCUMENTS

| | | | |
|---|---|---|---|
| 2012/0256917 A1* | 10/2012 | Lieberman | G06T 17/05 345/419 |
| 2014/0125574 A1* | 5/2014 | Scavezze | G06F 21/36 345/156 |
| 2016/0019382 A1* | 1/2016 | Chan | G06F 3/04815 726/19 |
| 2016/0091964 A1* | 3/2016 | Iyer | G02B 27/017 345/633 |
| 2016/0092877 A1* | 3/2016 | Chew | G06Q 20/4012 705/72 |
| 2016/0343168 A1* | 11/2016 | Mullins | G06F 3/015 |
| 2017/0324726 A1* | 11/2017 | Alleaume | H01F 38/14 |
| 2018/0158053 A1* | 6/2018 | Adams | G06F 3/011 |

\* cited by examiner

AUGMENTED REALITY AUTHENTICATION METHODS AND SYSTEMS

TECHNICAL FIELD

Generally, the embodiments disclosed herein relate to authentication methods. Particularly, the embodiments disclosed herein relate to interactive authentication methods and systems. More particularly, the embodiments disclosed herein relate to interactive authentication methods and systems in which augmented reality (AR) environments are utilized.

BACKGROUND

Current authentication methods have largely relied on passwords, which are based on a user's knowledge of facts, information or secrets. In the case of alphanumeric passwords, they are susceptible to being easily forgotten or lost by a user, especially after a long period of time. In addition, traditional alphanumeric passwords can become so unwieldy in their length and complexity that it is impossible to memorize them, in addition to being frustrating to input. Furthermore, the sheer number of passwords that are needed to access various computing devices, such as smartphones, and various content/data, such as video content and banking data, make the use of alphanumeric passwords cumbersome and tedious. Alphanumeric passwords also suffer from security issues, such as being susceptible to shoulder-surfing attacks in which third-party observers seek to identify the password by looking over the shoulder of the individual that is entering it.

In order to overcome the drawbacks of alphanumeric passwords, graphical passwords have also been developed, as it was thought that visual data is easier to remember and recognize than alphanumeric characters or words formed therefrom. However, graphical passwords still suffer from many of the drawbacks of alphanumeric passwords, including security threats posed by shoulder-surfing attacks for example.

To overcome the deficiencies of alphanumeric/graphical password-based authentication schemes, research has been conducted in the areas of augmented reality (AR)-based authentication schemes. For example, a device capable of rendering or displaying an AR environment allows a user to interact with a virtual keyboard to complete the authentication process, and thus protects the user against a shoulder-surfing attack. In another example, the AR authentication method may utilize a gaze-based system, whereby the gaze of a user's eyes is utilized to login a user when he or she views a scene generated on a display of an AR device. In addition to these systems, other AR-based authentication systems and methods have been investigated, but suffer from various drawbacks. For example, current AR authentication systems and methods do not render or display the AR environment in a manner that takes advantage of its ability to increase the ease at which the passcode is recalled from a user's memory (i.e. memorability), which is one of the most important criteria for a passcode authentication scheme. In addition, current AR authentication systems and methods also suffer from other drawbacks, including their failure to utilize an individual's episodic memory and context based memory.

Therefore, there is a need for authentication systems and methods in which a passcode is based on a user's navigation and/or interaction within an augmented reality (AR) environment, which allows the resulting passcode to be input with minimal time and effort. In addition, there is a need for authentication systems and methods in which a passcode is based on a user's navigation and/or interaction within an augmented reality (AR) environment, which allows the passcode to have enhanced usability. Furthermore, there is a need for authentication systems and methods in which a passcode is based on a user's navigation and/or interaction within an augmented reality (AR) environment to increase its memorability by the user, even after a long period of time. Still yet, there is a need for authentication systems and methods in which a passcode is based on a user's navigation and/or interaction with an augmented reality (AR) environment, whereby the passcode is difficult to guess or predict by third parties, so that the passcode has enhanced strength and security.

SUMMARY

In light of the foregoing, it is a first aspect of the various embodiments disclosed herein to provide an authentication method comprising displaying an augmented reality (AR) environment; interacting with the environment, such that the interaction defines an entered passcode; and determining whether the entered passcode is authenticated.

It is a further aspect to provide a device for controlling access to content comprising means for displaying an augmented reality environment; means for interacting with the environment to form an entered passcode; and means for determining whether the entered passcode is authenticated to determine if access to content controlled by the device is permitted.

BRIEF DESCRIPTION OF THE DRAWINGS

These and other features and advantages of the various embodiments disclosed herein will become better understood with regard to the following description, appended claims, and accompanying drawings wherein:

DETAILED DESCRIPTION

Figure 1:
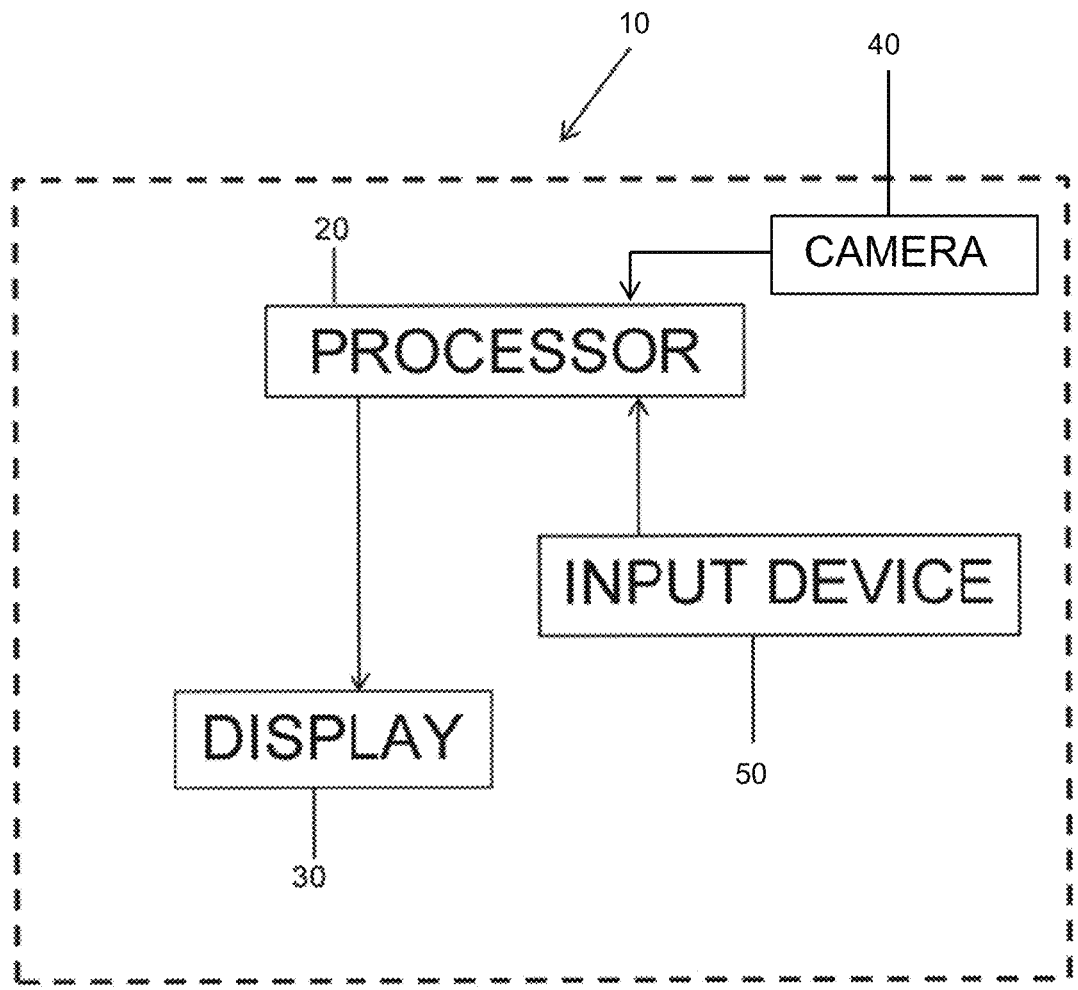
FIG. 1 is a block diagram of an input unit that is capable of executing an augmented reality (AR) authentication method in accordance with the concepts of the various embodiments discussed herein.

Various embodiments of an augmented reality (AR) authentication method and system are disclosed herein. In one embodiment, an AR authentication method is capable of being executed on an input unit or system 10, as shown in FIG. 1, so as to form an authentication system. It should be appreciated that the input unit 10 includes a processor 20 that is in operative communication with a display 30 that is capable of displaying an augmented reality (AR) environment that is a combination of real-world images captured by a camera 40, and computer-generated graphics, such as virtual icons that are combined with the real-word images. For example, in some embodiments, the real-world images captured by the camera 40 may be "mapped" (i.e. associated) to virtual or graphical tags or icons, such as text, whereby the movement or action of the real-world object within the field of view of the camera 40 controls the movement or action of the "mapped" tag or icon in the AR environment 306. In some embodiments, the real-world object detected by the camera 40 may be recognized by the processor 20, using suitable object recognition techniques, such that a user's real-world interaction with the real-world object is also used as part of their "set" passcode. In addition, an input device 50, such as a touch screen, may be utilized with the system 10, and is in operative communication with the processor 20. In some embodiments, the input device 50 allows a user to control one or more of the virtual icons, as well as "mapped" (i.e. associated) virtual icons that are present within the AR environment, that are presented on the display 30. As such, the AR authentication system and method enables a passcode to be defined or "set" by one or more actions performed with regard to one or more of the various real-world objects, virtual icons, and icons that are "mapped" to real-world objects that are within the AR environment. Accordingly, if the user subsequently interacts with one or more of the virtual icons, real-world objects, and/or "mapped" icons within the AR environment in a manner that matches his or her "set" passcode, then the user is authenticated.

Before discussing the particular features of the AR systems and methods, it should be appreciated that the use of an AR environment for defining a passcode allows benefits with regard to human memorability, including context-based memory and episodic memory, to be achieved. In particular, such improvements in a user's ability to recall a passcode from their memory is achieved because the objects that are used to "set" and authenticate their passcode via the AR authentication method are the same. In addition, the use of AR environments by the various embodiments disclosed herein supports a large passcode space, as such passcodes may include both the attributes of various objects in the AR environment, as well as the actions that can be performed by a user in controlling such objects in the AR environment. In addition, such AR authentication method has high usability, as the system carrying out the AR authentication method may utilize one or more gestures that combine all of the information used to form the passcode. Accordingly, the AR authentication method generates multi-dimensional passcodes, which have increased usability, memorability and security strength over that of conventional alphanumeric passcodes.

Continuing, the input unit 10 may comprise smart phones, tablet computers, portable or standalone computers, specialized computer systems, such as an ATM (automated teller machine), POS (point-of-sale) systems, distributed computer systems, future devices with AR capabilities, as well as combinations thereof and the like, which include the display 20, the input device 40 and the processor 20. Thus, the input unit 10 to enable a user to control one or more various virtual icons and/or real-world objects within a AR environment to "set" and authenticate their passcode, which will be discussed in detail below. In addition, the authentication method disclosed herein may be used to provide secure access to the input unit 10 itself such as in the case of a smartphone for example, or may be used to secure access to any application or content being executed, presented or stored by the input unit 10. However, in other embodiments, the input unit 10, or the necessary portions thereof, may be configured to be retrofit with existing devices and systems that would benefit from an additional level of authentication security that is provided by the AR authentication method. For example, a bank safe may be retrofit with the input unit 10, so that access to the contents within the safe is restricted to only those individuals that can be authenticated using the AR authentication method. Moreover, it should also be appreciated, that the AR authentication method may be utilized, or the input unit 10 in which the AR authentication method is carried out, may be utilized in any context where controlled or secure access to any digital or physical content, item, area, device, system, data, application or the like, is to be limited to only an authorized person or party who has an authenticatable passcode.

Specifically, the processor 20 utilized by the input unit 10 may include any suitable computing device, which includes the necessary hardware, software or combination thereof to execute the AR authentication method disclosed herein. It should also be appreciated that the processor 20 may comprise a general purpose or application specific computing unit. In some embodiments, the processor 20 may comprise a distributed computing system, or "cloud" computing system.

The display 30 of the input unit 10 may comprise any suitable display that is capable of presenting two-dimensional (2D) images or three-dimensional (3D) images. For example, the display 30 may utilize any display technology, such as liquid crystal display (LCD) technology for example, and may use any suitable 3D rendering technology, such as active shutter 3D or naked-eye 3D for example. In some embodiments, the 3D display 30 may comprise a touch screen. In other embodiments, the 3D display 30 may be a projector capable of projecting 3D images onto a surface or into space, such as in the case of a hologram. In further embodiments, the 3D display 30 may be configured as a virtual reality 3D display (i.e. stereoscopic display), which is able to present virtual reality (VR) 3D images. For example, the VR display may comprise any suitable head mounted display (HMD) that is worn by the user so that the display of the HMD encompasses the entire or partial field of view of the user. In some cases, the HMD may comprise that sold under the trademark Oculus Rift®. In still further embodiments, the display 30 may be a two-dimensional (2D) capable display, while the images presented thereon are formatted so as to appear in three-dimensions (3D). Such formatting techniques give the appearance to the user that the environment is in three-dimensions, and may include any suitable image shading and/or perspective techniques, or any suitable 3D depth cue for example.

The camera 40 is coupled in operative communication with the processor 20, and is configured to collect images, such as in real-time, of a user's real-world environment in which the user physically inhabits. It should be appreciated that the camera 40 may comprise a single lens or stereoscopic camera (i.e. 2 or more lens camera enabling depth perception), as well as an array of multiple cameras. In other embodiments, it should be appreciated that one or more of the camera elements may be tuned to image the user's real-world environment across only particular frequencies or ranges thereof, such as in the infrared range or near-infrared (NIR) for example.

In addition, the input device 50 may include any suitable device that allows the user to control his or her interaction within the AR environment presented on the display 30. For example, the input device 50 may be used to interact with one or more avatars or other virtual icons, as well as real-world objects that have been recognized by the camera 40 and processor 20, and converted to icons that can be interacted with. It should be appreciated that the virtual icons may comprise any symbol, character, object or any other virtual representation of any real or fictitious item, object, person or thing, that can be controlled by the input device 50 in the AR environment. In some embodiments, the avatar or virtual icon may define a virtual person that has one or more individually controllable body portions, such as controllable arms or hands that can be specifically moved relative to the AR environment. Furthermore, the input device 50 may include, but is not limited to: a touch screen interface, a direction pointer device, a stylus, a directional control pad, voice commands, head tracking systems, gaze-based input, as well as combinations thereof and the like.

Furthermore, in other embodiments, one or more motion tracking sensors or cameras, including those worn by the user or attached to the HMD, may act as the input device 50. For example, the motion tracking sensors or cameras may interpret the movement of one or more parts of the user's body, such as hands, arms, eyes, as well as facial expressions, gestures or the movement of another object or item attached to or held by the user, as control signals for controlling the movement and interaction of the avatar or icon within the AR environment. It should be appreciated that the avatar may be presented on the display 30 so that the user has a first-person or a third-person perspective of the icon as the icon moves and interacts within the AR environment. Thus, in some embodiments, the third-person icon or avatar may be replaced with a first-person avatar. In further embodiments, a first-person avatar perspective may be utilized without any avatar, such that only the environment with relation to the user is shown on the display 30.

Thus, the processor 20, the display 30, and the input device 50 of the input unit 10 communicate together in order carry out the AR authentication process to be discussed in detail below, using any suitable wired or wireless communication protocol, or combination thereof. It should be appreciated that while the input unit 10 is configured so that the processor 20, the display 30, the camera 40, and the input device 50 may be provided in a single unit, they may be discretely or separately arranged so that one or more of them are remotely located from the other by any desired distance. For example, the display 30 on which the interactive AR environment is presented and the input device 50 that is used to control the movement/interaction and actions of the avatar within the AR environment may be remotely located from the processor 20. In some embodiments, the input unit 10 may be configured to include the display 30 and the input device 50, which are configured to be interfaced or retrofit with an existing processor that is part of or maintained by another device or system. For example, the display 30, the camera 40 and the input device 50 may be retrofit or interfaced with a processor, such as by a wired or wireless input/output interface, of an existing POS (point-of-sale) or ATM (automated teller machine) system.

In some embodiments, the input unit 10 may be configured so that the processor 20, the display 30 and the camera 40 are provided as a wearable device, including a head-mounted device (HMD), such as glasses or goggles, including that provided as Google Glass™ or Microsoft HoloLens™. In addition, the input device 50 may further include devices, such as a gesture recognition device, including a Leap Motion™ controller or a Myo™ armband for example. In some embodiments, the input device 50 may be configured using software, hardware or a combination of both to recognize a user's gestures. For example, the camera 40 may be configured to capture a user's gestures that are performed by one or more body parts, such as their hands, as inputs for interacting with the augmented reality (AR) environment presented on the display 30. In other embodiments, the input device 50 may serve as an input device for capturing a user's gestures. As such, the camera 40 and/or the input device 50 serve to control the user's interaction with the AR environment and objects therein so as to "set" and "enter" their passcode in a manner to be discussed.

Continuing, the camera 40 comprises any suitable imaging device capable of capturing a continuous, real-time or near real-time, image of a user's real-world environment. That is, the camera 40 may be oriented to have a perspective that simulates a user's field of view captured by their eyes. It should be appreciated that such real-world images may be further processed using any desired technique to achieve a particular appearance (e.g. color, dimension, etc.) when presented on the display 30. As such, the camera 40 functions to provide a static or live-moving image for presentation as a real-world environment for presentation on the display 30.

In addition, the processor 20 implementing the AR authentication method 100 to be discussed presents an AR environment on the display 30, which includes a real-world image of a user's environment as captured by the camera 40. In addition, the AR environment includes one or more computer-generated icons (i.e. virtual icons) as a constructive overlay (i.e. as an addition to the base real-world image) relative to the real-world environment image, and/or as a destructive overlay (i.e. as a mask to a portion of the base real-world image) relative to the real-world environment image. It should also be appreciated that real-world objects imaged by the camera 40 may be converted to virtual icons by the system 10 using suitable object detection techniques, and as a result such virtual icons can also be interacted with by the user in the manners discussed herein.

The AR authentication process 100 incudes 3 separate phases, an AR passcode "setting" step, an AR environment generation step, and a passcode verification or authentication step.

AR Passcode Setting:

In some embodiments, the authentication method may allow a user to select between an AR-based authentication method and another authentication method, or the authentication method may utilize a combination of both AR-based authentication and another authentication method. For example, during the passcode setting step, a user may "set" their passcode by viewing the display 30 and using such methods associated with conventional passcode authentication methods (i.e. AR-parasite passcode). Such conventional passcode authentication methods include alphanumeric passcodes, Google™ pattern unlock, chess-based multi-dimensional AI passcode scheme (CMAPS), as well as other non-conventional authentication techniques, which are set forth with regard to the various embodiments presented herein, as well as those set forth in U.S. patent application Ser. No. 15/943,847 entitled "Shoulder-Surfing Resistant Authentication Method and Systems" and U.S. patent application Ser. No. 15/943,910 entitled "Authentication Method for a Computing Device Using Interactive Game Board and Game Piece Images", incorporated herein by reference. For example, a user may "set" their passcode by adding an additional "attack" to a white king on a chess game board, as presented on the display 30. As such, in some embodiments, the AR-parasite passcode scheme may be configured so that a user's interaction with real-world objects does not form part of the passcode, as only the interaction of virtual icons are used to "set" a user's passcode. However, the AR-parasite passcode scheme may be configured in any desired manner, and may be implemented in combination with any one or more of the various schemes and techniques for presenting and interacting with the AR environment discussed herein.

The authentication method 100 may utilize a user's particular sequence of interaction with one or more real-world objects, virtual icons, and "mapped" real-world objects and virtual icons, which are in the AR environment and presented on the display 30 to "set" their passcode. In some embodiments a recommended behavior or interaction to be performed by the user to "set" their passcode may be indicated on the display 30 by the authentication method. That is, the system 10 may suggest or recommend that the user use a coffee making procedure, as captured by the camera 200 as his or her passcode. As such, the user's actions in preparing coffee in the AR environment, as captured and recorded by the camera 40, form the user's "set" passcode. Such suggestion or recommendation of a particular task or sequence of steps may be based on various metrics, such as frequency of a user's behavior and/or differences that exist, as compared with another person's behavior. In some embodiments, the user may modify or redo their passcode prior to being required to confirm their passcode before it is confirmed as being "set" for use in subsequent authentications of an entered passcode.

Alternatively, a user's passcode may be "set" without being prompted by a recommended action or process to be performed. Thus, to "set" their passcode, the user captures and records his or her interaction with the AR environment, using the camera 40, a particular behavior that he or she wishes to perform. In some embodiments, the user may modify or redo their passcode prior to being required to confirm their passcode is to be "set" for use in future authentications. For example, a user may wish to replace their favorite mug with a rarely used cup.

Figure 2:
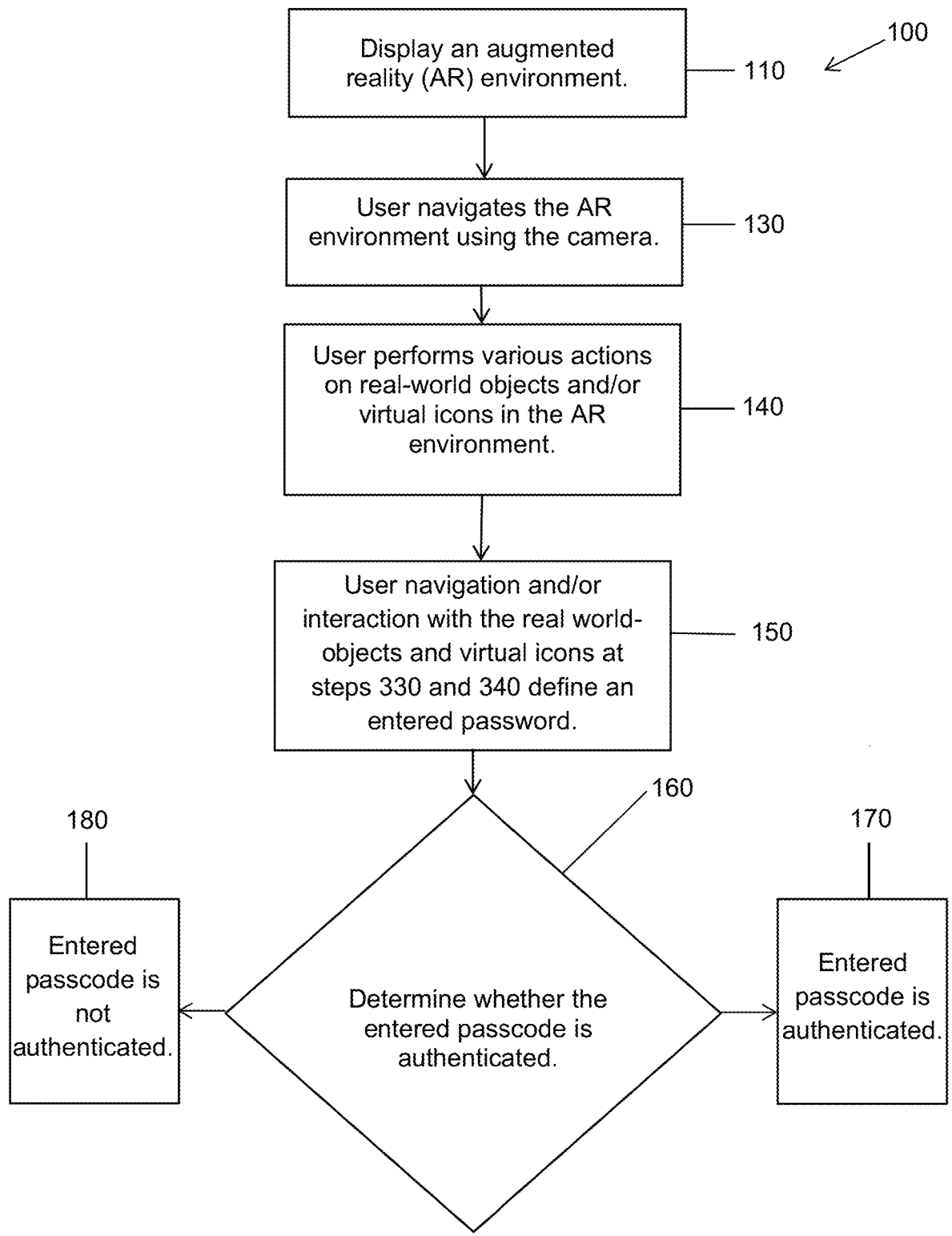
FIG. 2 is a flow diagram of another embodiment of an AR authentication method in accordance with the concepts of the various embodiments disclosed herein.
Figure 3:
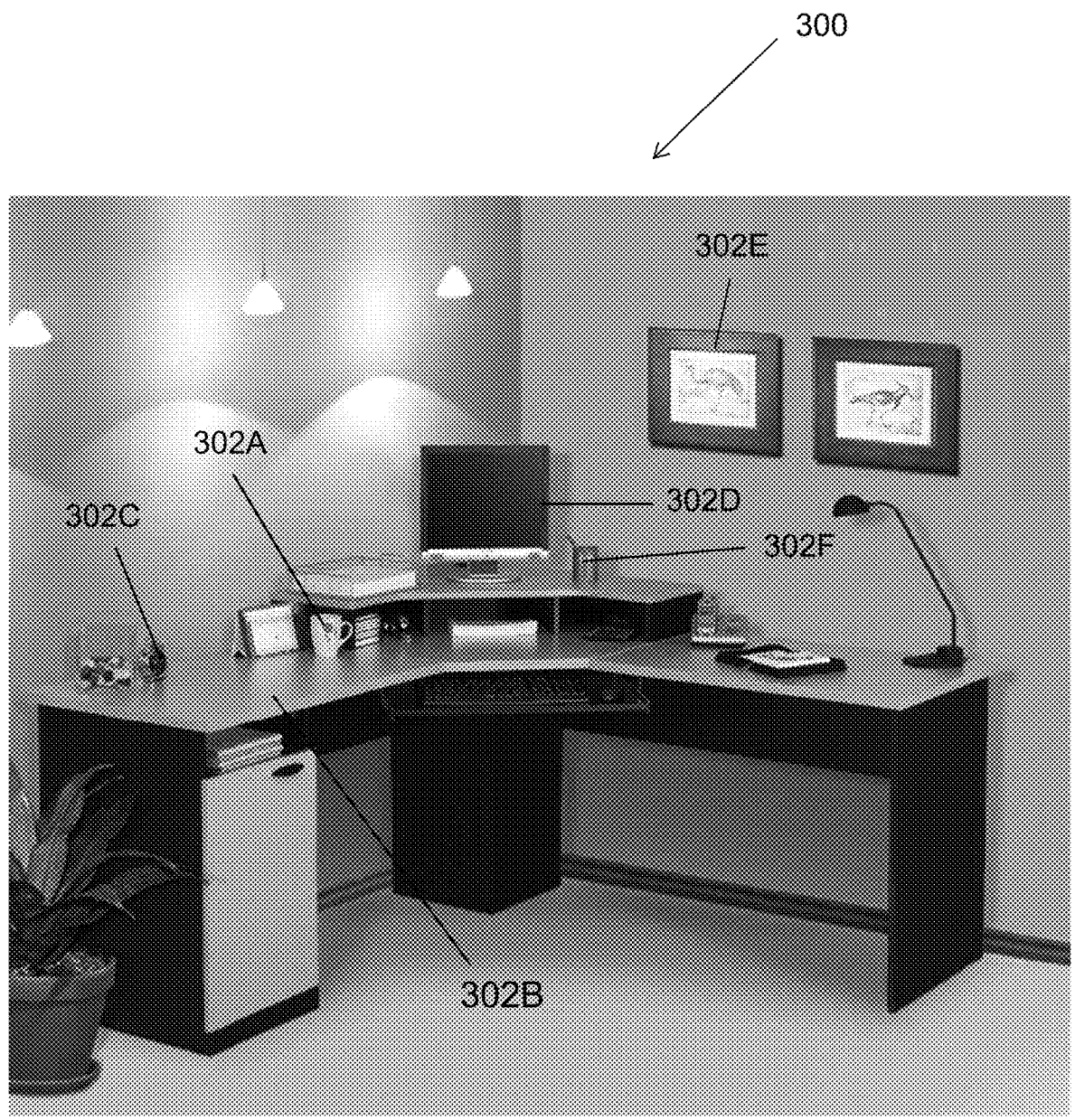
FIG. 3 is a diagrammatic view of a user's real-world environment captured by a camera of the input unit of FIG. 1 in accordance with the concepts of the various embodiments discussed herein.
Figure 4:
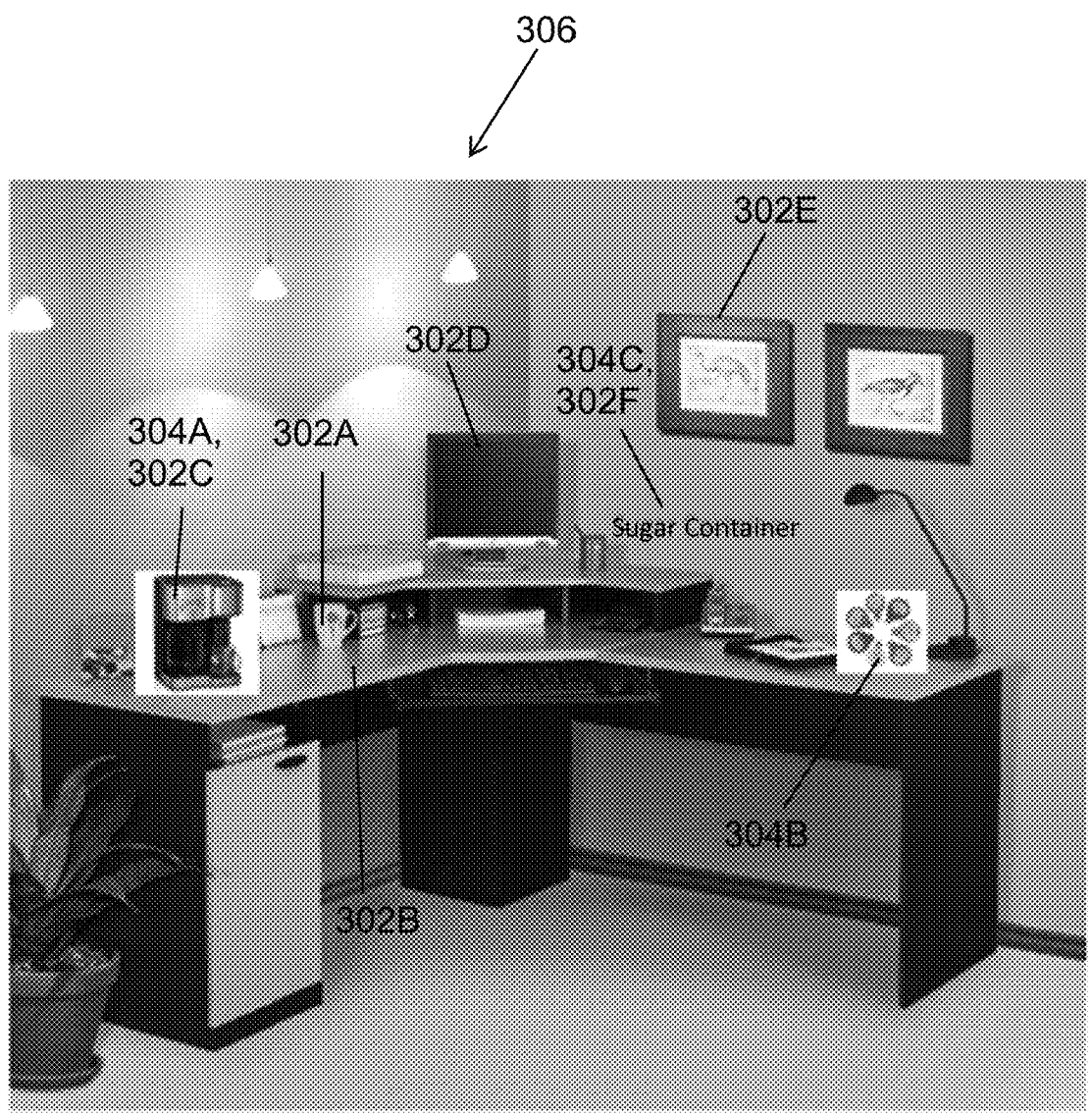
FIG. 4 is a diagrammatic view of an augmented reality (AR) environment including a real-world environment and virtual icons for presentation on the display of the input unit in accordance with the concepts of the various embodiments discussed herein.
Figure 5:
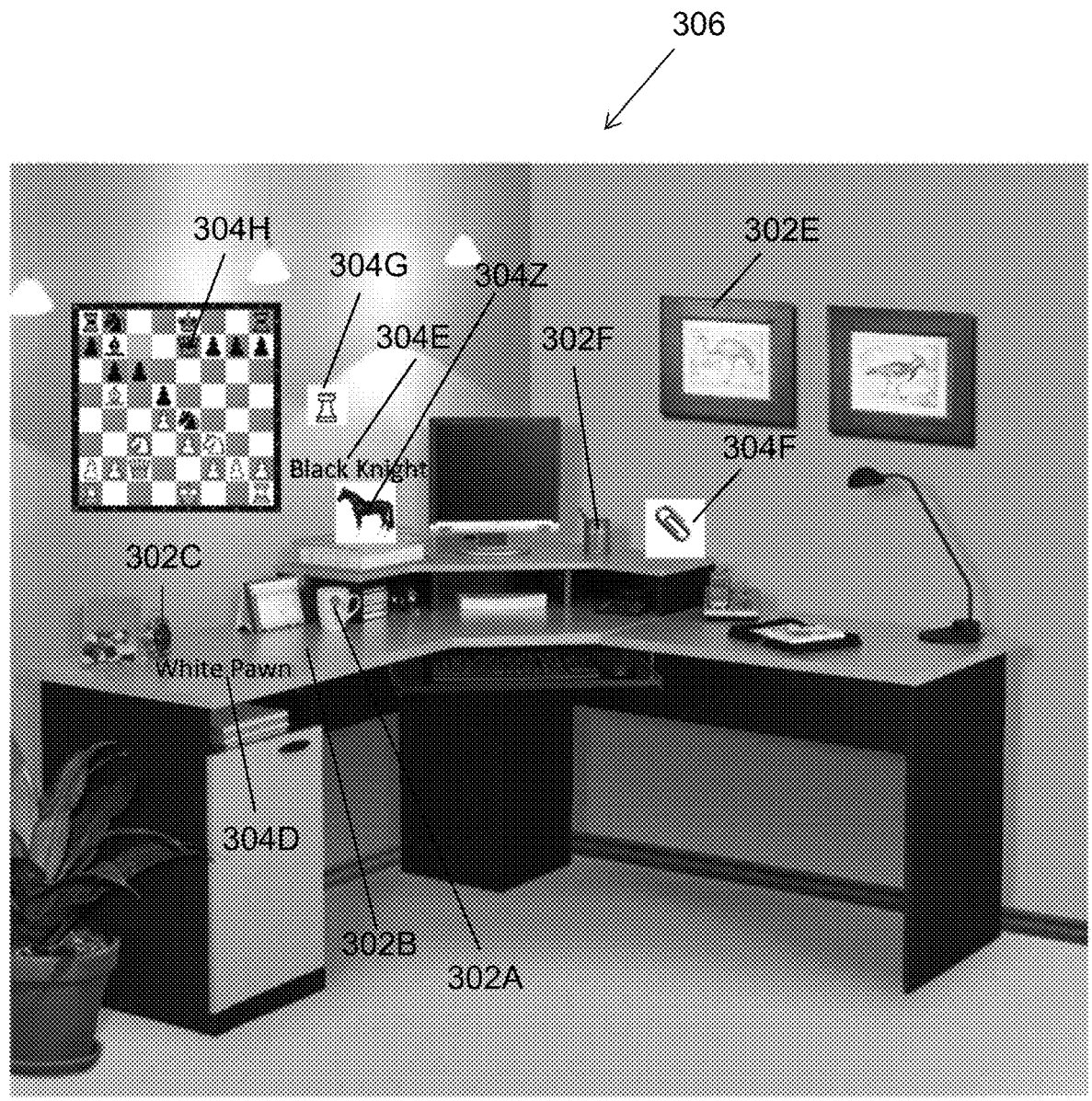
FIG. 5 is a diagrammatic view of another augmented reality (AR) environment including a real-world environment and virtual icons for presentation on the display of the input unit in accordance with the concepts of the various embodiments discussed herein.

AR Environment Generation:

When a user desires to gain access to content that is controlled by the input unit 10, an entered passcode is authenticated using the process 100, as shown in FIG. 2. Initially, at step 110 of the authentication process 100 an augmented reality (AR) environment 306 is generated for presentation on the display 30. The AR environment 306 includes images of the real-world environment 300, and objects 302 contained therein, as shown in FIG. 3, which are captured by the user's camera 40. In addition the AR environment 306 includes one or more various computer generated icons 304, as shown in FIGS. 4 and 5. Thus, the AR environment 306 is formed as the combination of real-world image or images, and one or more virtual icons.

More particularly, the process performed at step 110 may be configured to include an object detection/generation process, and a target environment structuring process. Specifically, the object detection and generation process of step 110 generates the AR environment 306, which includes the real-world image 300, as captured by the camera 200. In some embodiments the real-world image may be a static image, such as a photograph, a pre-recorded video, or a live real-time or near real-time video image. For example, as shown in FIG. 3, the real-world image of a user's environment may include a mug 302A, an office table 302B, an alarm clock 302C, a computer monitor 302D, and a wall-mounted picture 302E. In addition to the real-world image 300, virtual or computer-generated images or graphics, also referred to as icons 304, are displayed relative to the real world image 300 to form the AR environment 306, as shown in FIGS. 4 and 5. That is, the icons are positioned on the real-world image 300 as a constructive or destructive overlay as previously discussed above. Specifically, the authentication method identifies or recognizes, using known techniques, various objects in the real-world image 300. The authentication method then generates one or more virtual icons 304, such as those shown in FIG. 4, which are placed relative to those identified real-world objects 302 for presentation on the display 30. The number, type, and attributes of the icons 304 may be determined by the user or by the authentication method, and may take into account the strength of the passcode needed for the particular application or use, and user memorability. For example, FIG. 4 shows various virtual icons, such as a coffee machine 304A and coffee creamer 304B In addition, which includes virtual objects, such as a coffee machine 304A, and coffee creamer 304B. In addition, a sugar container 304C is provided as a virtual icon (e.g. text) that is "mapped" to a real-world pen holder 302F, and as such, this "mapping" indicates that the pen holder 302F is to be treated as if it represents a sugar container 304C in the AR environment 306. Thus, the "mapped" real-world pen holder 302F takes on the attributes of a sugar container 304C within the AR environment 306. In addition, the AR environment 306 in FIG. 5 also includes virtual icons 304, such as a chess board 304H, a horse toy 304E, a paper clip 304F, a chess piece 304G, and a white pawn 304D.

During target environment structuring at step 110 of the process, the AR environment 306 is generated on the display 30 to enable the authentication of an entered passcode that has been previously "set". The AR environment 306 presented on the display 30 includes two types of images: 1.) images from the real world that include the real-world image 300 objects 302 that are captured by the camera 200, and 2.) virtual images that include virtual icons 302 superimposed within the real-world image 300 in the manner previously discussed. In addition, during the password "setting" phase, the display 30 may present the AR environment 306 with "mapping" of the virtual icons between 1.) real-world objects from the image of a user's real-world environment 300 captured by the camera 40, and 2.) computer-generated virtual icons 304. Object "mapping" refers to the association that is created between one or more virtual icons, such as written text or tags, and one or more real-world objects found in a user's real-world environment. The result of the mapping of a virtual icon to a real-world object, causes the real-world object to take on the properties or characteristics of the mapped virtual icon, and accordingly it is treated by the authentication process as being the mapped virtual icon in the AR environment. For example, as shown in FIG. 5, the AR environment 306 may include real-world objects including a table top 302B and an alarm clock 302C; with the alarm clock 302C being mapped to a "white pawn" chess piece icon 304D.

In addition to the mapping between real-world objects and virtual icons in the AR environment 306 used in the passcode setting process and in the passcode authentication process, the AR environment 306 presented on the display 30 may be configured using one or more of the following relationships between the real-world objects and the virtual icons:

1. Real-world object re-use: real-world objects presented in the AR environment 306 may be used to form a user's passcode or a portion or part thereof. For example, as shown in FIG. 3, a real-world coffee mug 302A placed on a real-world office table 302B may be re-used as the coffee mug utilized in the passcode setting and authentication phases.
2. Real-world object mapping: real-world objects presented in the AR environment 306 may be "mapped" or "linked" to a virtual icon. By this mapping, real-world objects 302 in the displayed AR environment 306 are identified as mapped objects through mapping data, which may include written text or a virtual icon that overlays or is positioned near or over the real-world object that is being mapped. In some cases, the mapping data that is linked or mapped to the "real-world" object may move with the real-world object as the real-world object is moved within the AR environment as presented on the display 30. As a result, the mapped real-world object takes on the characteristics/functions that the mapping data defines. For example, a real-world clock 302C, as shown in FIG. 3, may be labeled as a "white pawn" (i.e. mapping data), as shown in FIG. 5, whereby the real-world clock 302C functions as a white pawn chess piece 304D, and is able to be moved onto a virtual chess board 304H through a user gesture that is captured by the camera 40 or through the use of the input device 50, such as the touch screen provided by the display 30. Alternatively, it should be appreciated that the "mapped" virtual icon may be moved within the AR environment by physically moving the real-world object to which the virtual icon is mapped. Another example in which object "mapping" occurs is when a real-world pen holder 302F, as shown in FIG. 3, is mapped, whereby the virtual icon is provided as written text labeling or mapping data, to a virtual sugar container, as shown in FIG. 4, for use in setting an AR-native passcode using a coffee making process.
3. Virtual icons: one or more virtual icons may be presented as standalone icons in the AR environment 306 and used in the passcode setting and authentication process. For example, as shown in FIG. 4, one virtual icon may include a coffee machine 304A, which is used or treated as a coffee machine, during the passcode setting (AR-native passcode) and authentication process.
4. Virtual icon mapping: One or more virtual icons in the AR environment can be mapped to another object or function, such as through written text labeling, whereby the text labeling identifies what features/attributes/characteristics the virtual icon is to take on. For example, as shown in FIG. 5, a virtual icon shown as a horse toy 304E is mapped, through text labeling, to a black knight chess piece 304Z. As such, the horse toy 304E is treated as a "black knight chess piece" within the AR environment 306 shown on the display 30. Accordingly, the black knight 304Z may then be placed on to the virtual chess board icon 304H, by moving the virtual horse toy by using a gesture captured by the camera 40, or by controlling the input device 50 in a suitable manner. In some cases, the mapping data may move with the virtual icon to which the mapping data is linked or mapped.
5. Virtual icons without mapping: One or more virtual icons, such as text, may be presented throughout the AR environment 306 without any "mapping" to real-world objects. These virtual icons may be used in the AR environment 306 to increase the complexity of the passcode, so as to increase its strength. For example, as shown in FIG. 5, virtual icons representing a paper clip 304E and a white rook chess piece 304G may be moved within the AR environment 306 by the input device 50, but are not utilized in the passcode setting and authentication process. Such unmapped virtual icons 304 in some cases may be provided to increase the number of interactive components displayed in the AR environment 306, and therefore are used to increase the complexity of a user's passcode, even though a user's passcode does not directly utilize any of the unmapped virtual icons 304.

It should be appreciated that one or more of the techniques 1-5 described above may be utilized to create the AR environment 306 used to "set" and/or "authenticate" a user's passcode. Furthermore, it should be appreciated that the use of any of the "mapping" techniques discussed herein, such as in the case of a "real-object mapping" and "virtual object mapping" for example, may be configured so that the "mapping" label changes in accordance with one or more various schemes. For example, the "mapping" may change after each iteration of the passcode authentication process, after a predetermined number of authentication attempts, or after a predetermined amount of time, or based on any desired parameter. For example, during a first authentication attempt of a user's passcode, the clock 302C may be mapped to the pawn 304D, as shown in FIG. 5. However, during the next authentication attempt in which the user's passcode is entered, a different object, such as a coffee mug 302A, may be mapped to the pawn 304D, while the clock 302C is mapped to another object.

Furthermore, it is contemplated that the "mapping" between a real-world object and a virtual icon that this "mapped" thereto may change randomly, periodically or as part of a predetermined sequence or scheme, so as to provide an additional level of protection against shoulder-surfing attacks. For example, in some embodiments, during the authentication of a user's entered passcode (i.e. log-in attempt) a real-world clock is mapped to a virtual pawn icon. However, during a next authentication attempt, a different real-world object is mapped to the virtual pawn icon, while the real-world clock is mapped to another virtual icon. As a result, the different mapping increases makes it more difficult for a "would be" shoulder-surfer to acquire the user's entered passcode.

Passcode Authentication:

Continuing with the discussion of the passcode authentication process 100 shown in FIG. 2, and after the AR environment 306 has been presented on the display 30 at step 110, the process proceeds to step 130. At step 130, the user navigates the AR environment 360 through the use of their camera 40. In some embodiments, navigation of the AR environment 306 may occur through the use of one or more of the camera 40, other imaging sensors (e.g. infrared (IR)), and location positioning sensors, including the global positioning sensor (GPS), and combinations thereof, to update a user's location in the real-world, and thereby updating the AR environment 306 that is presented on the display 30. Next, at step 140, a user interacts with the AR environment 306 and performs various actions with the real-world objects 302 and/or the virtual icons 304 presented therein. Specifically, actions performed on real-world objects 302, including real-world objects "mapped" to virtual icons, in the AR environment 306 are carried out by the user moving, controlling, or interacting with such real-world objects in their real-world environment or by way of the input device 50.

Whereas, the actions, including moving, controlling, or interacting with virtual icons 304, as well as virtual icons that are "mapped" to real-world objects, are carried out by a user's physical gestures, such as hand gestures, that are captured by the camera 200, as well as through the use of the input device 50, which may include a touch screen provided by the display 30, or other suitable device, such as a directional keypad for example.

The user completes entering their passcode by navigating the AR environment 306 and performing certain actions with the real-world objects 302 and/or the virtual icons 304, as indicated at step 150. It should be appreciated that the particular order or sequence in which the various real-world objects and virtual icons are interacted with by a user within the AR environment 306 may or may not form part of a user's "set" or "entered" passcode. Continuing to step 160, the authentication process 100 determines whether the entered passcode is authenticated or not by comparing it with the previously "set" passcode created by the user. Accordingly, if there is a match between the entered passcode and the "set" passcode, then the entered passcode is authenticated, as indicated at step 170. However, if the entered passcode and the "set" passcode do not match, then the entered passcode is not authenticated, as indicated at step 180.

For example, in the case of authenticating an AR passcode, such as an AR-native passcode, where a coffee making process has been "set" as a user's passcode, the authentication process 100 requires that the user satisfy the requirements of the "set" passcode. Such requirements may include interacting with the AR environment 306 by adding an amount of creamer 304B to the coffee poured from the coffee maker 304A to the mug 302A for example, and/or including the correct type of creamer from among the plurality of creamers 304B to the coffee in the mug 302A. As previously discussed, it should also be appreciated that the particular order or sequence in which the various real-world objects and virtual icons are interacted with by a user within the AR environment 306 may or may not form part of a user's "set" passcode. For example, a user's passcode may require that sugar is put into the mug 302A before the coffee is poured in. However, in other embodiments, a user's passcode may only require that the sugar and the coffee are put into the mug at some point, but are not required to be put into the mug in a certain order. In another example of authenticating an AR passcode, such as an AR-parasitic passcode, the user may move their virtual chess pieces 304D, 304G, 304E in the necessary manner on the virtual chessboard 304H to satisfy the requirement of adding an additional attack to a white king for example. As previously discussed, the chess pieces may be provided in the AR environment 306 as real-world chess pieces (or real-world objects mapped to virtual chess pieces) or virtual icons representing chess pieces, or a combination thereof. It should also be appreciated that in some embodiments, a set passcode may be formed by the combination of one or more steps or interactions performed as part of the AR-parasitic passcode with one or more steps or interactions performed as part of the AR-native passcode. For example, one or more of the coffee making steps discussed above as part of the AR-native passcode may be combined with one or more chess moves discussed above as part of the AR-parasitic passcode to form a user's "set" passcode.

Accordingly, it should be appreciated that the AR passcode is formed from a sequence of interactions with real-world objects 302 and/or virtual icons 304 in the AR environment 306 presented on the display 30 of the input unit 10. Such sequence of interactions encompass any act capable of being performed in the real-world by a user, such as the sequence of steps taken to make coffee for example. That is, such sequence of interactions may include manipulating the real-world objects 302 and virtual icons 304 in some sequence, as well as the user's movement (including movement of body parts) relative to the real-world objects 302 and virtual icons 304 in the AR environment 306, or any combination thereof. It should also be appreciated that the sequence or order in which a user interacts with the various real-world objects and virtual icons in the AR environment 306 may or may not form part or the entirety of a user's passcode. Furthermore, the authentication method may be configured to enable various virtual interactions within the AR environment 306 to be used to form a user's passcode. Such virtual interactions are computer generated by the system 10 and are not capable of being performed in the real world. For example, a virtual interaction may include making the real-world office desk 302B disappear in the AR environment 306. It is this sequence of interactive steps with the various objects 302 and icons 304 in the AR environment 306 that defines the user's passcode for purposes of passcode setting and passcode authentication.

One advantage of the AR authentication system and method is user memorability, as it takes advantage of human memory systems, such as context-based memory and episodic memory. This memory system assists in improving the recall of passcodes when the objects that are present at the passcode "setting" phase and the passcode "authentication" phase are the same or similar. Another advantage of the AR authentication system and method is that it reduces user memory interferences because different types of information, such as object attributes and user gestures that are performed on objects, can be included as part of the passcode. Still another object of the present invention is that the AR system and method increases the usability of passcodes. Yet another advantage of the present invention is that gestures recognized by the authentication system can be used to combine various information together, to form a passcode. For example, a gesture captured by the camera 40 and/or the input device 50 of adding creamer into coffee may include the type of creamer, the amount of creamer, and the physical attributes of the coffee mug together. Thus, for the same level of security strength, the number of user gestures that are required to be performed by the AR authentication process is less than the number of user gestures required by conventional authentication processes. The AR authentication process also supports a large passcode space because of the inclusion of object attributes and actions on the objects that are incorporated into the passcodes.

Therefore, it can be seen that the objects of the various embodiments disclosed herein have been satisfied by the structure and its method for use presented above. While in accordance with the Patent Statutes, only the best mode and preferred embodiments have been presented and described in detail, with it being understood that the embodiments disclosed herein are not limited thereto or thereby. Accordingly, for an appreciation of the true scope and breadth of the embodiments, reference should be made to the following claims.

What is claimed is:

1. An authentication method comprising:
displaying an augmented reality (AR) environment, wherein said AR environment includes an image of a real-world environment, at least one or more real world objects each of the one or more real world objects having their own properties and characteristics within the AR environment, and at least one or more virtual icons each of the more or more virtual icons having their own properties and characteristics within the AR environment, and wherein one of said at least one or more virtual icons is mapped to one of said real-world objects to define at least one or more mapped objects each one or more mapped objects having their own properties and characteristics within the AR environment and wherein the properties and characteristics of each of the one or more mapped objects are different than the properties and characteristics of the real-world object said each of the one or more mapped object is mapped to, and wherein movement or action of the real-world object that has been mapped to one of said virtual icons controls the movement or action of the mapped object;

interacting with said environment, such that said interaction defines an entered passcode, wherein said interacting step is performed by navigating said AR environment through the movement of one of the at least one or more real world objects, one of the at least one or more virtual icons, or one of the at least one or more mapped objects within the AR environment; and determining whether the entered passcode is authenticated.

2. The authentication method of claim 1, wherein said at least one or more virtual icons are displayed as virtual objects.

3. The authentication method of claim 2, wherein said interacting step includes a plurality of steps.

4. The authentication method of claim 3, wherein one or more of said steps is excluded from forming said entered passcode.

5. The authentication method of claim 3, wherein said virtual objects are controlled by an input device, selected from the group consisting of: a touch screen interface, a keyboard, a direction pointer device, a stylus, a directional control pad, a camera, a motion tracking device, or a voice recognition device.

6. The authentication method of claim 1, wherein said displaying step is performed by a display selected from a group consisting of a flat-panel display, a touch screen display, a virtual reality (VR) display, and a wearable display.

7. The authentication method of claim 1, wherein said interacting step-includes interacting with one or more of said real-world objects, said one or more mapped objects or said virtual icons.

8. The authentication method of claim 7, wherein said interacting step includes controlling said one or more of said real-world objects, said one or more mapped objects, or said virtual icons in a predetermined sequence.

9. The authentication method of claim 1, wherein said at least one of said real world objects is mapped to a mapped virtual icon.

10. The authentication method of claim 1, wherein said at least one of said virtual icons is mapped to a mapped virtual icon.

11. The authentication method of claim 10 further comprising:

changing or removing said mapped virtual icon after said determining step.

12. The authentication method of claim 1, wherein said at least one of the one or more virtual icons comprises a plurality of icons, wherein at least one of said plurality of icons is static.

13. A device for controlling access to content comprising:

means for displaying an augmented reality (AR) environment, wherein said AR environment includes an image of a real-world environment having at least one or more real world objects each of the one or more real world objects having their own properties and characteristics within the AR environment, and at least one or more virtual icons each of the more or more virtual icons having their own properties and characteristics within the AR environment, and wherein one of said at least one or more virtual icons is mapped to one of said real-world objects to define at least one or more mapped objects each one or more mapped objects having their own properties and characteristics within the AR environment and wherein the properties and characteristics of each of the one or more mapped objects are different than the properties and characteristics of the real-world object said each of the one or more mapped object is mapped to, and wherein movement or action of the real-world object that has been mapped to one of said virtual icons controls the movement or action of the mapped object;

means for interacting with said environment to allow for navigation through said AR environment through the movement of one of the at least one or more real world objects, one of the at least one or more virtual icons, or one of the at least one or more mapped objects within the AR environment such that said movement forms an entered passcode; and means for determining whether said entered passcode is authenticated to determine if access to content controlled by the device is permitted.

14. The device of claim 13, wherein said means for displaying comprises a display selected from a group consisting of a flat-panel display, a touch screen display, a virtual reality (VR) display, and a wearable display.

15. The device of claim 13, wherein said at least one or more virtual icons is controlled by an input device, selected from the group consisting of: a touch screen interface, a keyboard, a direction pointer device, a stylus, a directional control pad, a camera, a motion tracking device, or a voice recognition device.

16. The device of claim 13, wherein said at least one of the one or more real world objects is mapped to a mapped virtual icon.

17. The device of claim 13, wherein said at least one of the one or more virtual icons is mapped to a mapped virtual icon.

18. The device of claim 13, wherein said at least one of the one or more virtual icons comprises a plurality of icons, wherein at least one of said plurality of icons is static.

* * * * *